United States Patent
Smith et al.

(10) Patent No.: US 11,143,418 B2
(45) Date of Patent: Oct. 12, 2021

(54) SYSTEM AND METHOD FOR CONTROLLING A VARIABLE-SPEED APPLIANCE CIRCULATOR

(71) Applicant: The Marley Company LLC, Burr Ridge, IL (US)

(72) Inventors: Aaron Smith, Lake Bluff, IL (US); Neil Butt, New Carlisle, IN (US)

(73) Assignee: The Marley Company LLC, Burr Ridge, IL (US)

( * ) Notice: Subject to any disclaimer, the term of this patent is extended or adjusted under 35 U.S.C. 154(b) by 85 days.

(21) Appl. No.: 16/374,109

(22) Filed: Apr. 3, 2019

(65) Prior Publication Data

US 2020/0318836 A1 Oct. 8, 2020

(51) Int. Cl.
| F24D 19/10 | (2006.01) |
| G05D 7/06 | (2006.01) |
| F24D 17/00 | (2006.01) |
| F24D 12/02 | (2006.01) |
| F25B 25/00 | (2006.01) |
| F24F 5/00 | (2006.01) |

(52) U.S. Cl.
CPC ......... *F24D 19/1012* (2013.01); *F24D 12/02* (2013.01); *F24D 17/0078* (2013.01); *F24D 19/1051* (2013.01); *F24F 5/0003* (2013.01); *F25B 25/005* (2013.01); *G05D 7/0629* (2013.01); *F25B 2600/13* (2013.01); *G05B 2219/2614* (2013.01)

(58) Field of Classification Search
CPC .. F24D 19/1012; F24D 12/02; F24D 17/0078; F24D 19/1051; F24F 5/0003; F25B 2600/13; F25B 25/005; G05B 2219/2614; Y02B 30/70; F04B 23/04
See application file for complete search history.

(56) References Cited

U.S. PATENT DOCUMENTS

| 5,466,995 A | 11/1995 | Genga |
| 5,540,555 A | 7/1996 | Corso et al. |
| 6,390,381 B1 | 5/2002 | Laing |
| 7,044,398 B2 | 5/2006 | Sweet |
| 2008/0179415 A1* | 7/2008 | Johnson ................. F24D 12/02 237/8 A |
| 2012/0298226 A1 | 11/2012 | Struempler |
| 2016/0265793 A1* | 9/2016 | Copeland ................ F24B 1/183 |
| 2017/0219219 A1 | 8/2017 | Miller et al. |
| 2017/0299200 A1 | 10/2017 | Mercier, Sr. |
| 2018/0195745 A1 | 7/2018 | Rice |
| 2018/0209664 A1 | 7/2018 | Heath |

* cited by examiner

*Primary Examiner* — Atif H Chaudry
(74) *Attorney, Agent, or Firm* — BakerHostetler (57) ABSTRACT

The present disclosure pertains to a system configured to prepare and use prediction models for classifying images. Some embodiments may: obtain, via a system return temperature sensor, a system return temperature; obtain, via an appliance return temperature sensor, an appliance return temperature; and responsive to a determination that the appliance return temperature is greater than the system return temperature by at least a first threshold amount, decrease, via a hardware processor, a speed of the appliance pump.

17 Claims, 5 Drawing Sheets

SYSTEM AND METHOD FOR CONTROLLING A VARIABLE-SPEED APPLIANCE CIRCULATOR

TECHNICAL FIELD

The present disclosure relates generally to systems and methods for controlling a pump. More particularly, the disclosure relates to controlling a variable-speed appliance circulator, which is piped in a secondary loop with the appliance, based on detected temperature changes at a system return and/or system supply.

BACKGROUND

Control theory is a subfield of mathematics that deals with the control of continuously operating dynamic systems in engineered processes and machines. Often the objective is to develop a control model for controlling such systems using a control action in an optimum manner, without delay or overshoot, ensuring control stability. For example, controllers may operate with respect to appliances (e.g., boiler, chiller, etc.), energy inputs (e.g., gas, electricity, etc.), and circulators of fluids.

Known hydronic systems utilize variable-speed primary circulators to adjust primary flows, to meet building heating and cooling loads. As a heating or cooling load decreases, flow in the primary loop decreases. But, for an appliance piped in a secondary loop (e.g., via a hydraulic separation device) with a single-speed circulator, flow through the single-speed circulator and appliance may be unchanged by the variable, primary flow. This may result in problems, such as a recirculating flow through the secondary loop, a return flow (i.e., to the single-speed circulator and appliance) becoming tempered, excessive pumping power being consumed, and efficiency of the appliance being decreased.

SUMMARY

Systems and methods are disclosed for algorithmically controlling a pump in a hydronic system such that temperature differences measured by supply and return sensors are minimized to optimize the flow in an appliance secondary loop by minimizing recirculating flows through primary and/or secondary loops. Accordingly, one or more aspects of the present disclosure relate to a method for: obtaining, via the system return temperature sensor, a system return temperature; obtaining, via an appliance return temperature sensor, an appliance return temperature; and responsive to a determination that the appliance return temperature is greater than the system return temperature by at least a first threshold amount, decreasing a speed of the appliance pump. One or more other aspects of the present disclosure relate to a method for: obtaining, via the system supply temperature sensor, a system supply temperature; obtaining, via the appliance supply temperature sensor, an appliance supply temperature; and responsive to a determination that the appliance supply temperature is greater than the system supply temperature by at least a second threshold amount, increasing the speed of the appliance pump. The method is implemented by at least a hardware processor configured by machine-readable instructions and/or other components.

Yet another aspect of the present disclosure relates to a system configured for algorithmically controlling a pump in a hydronic system. The system comprises a processor and other components (e.g., storage device(s) from which machine-readable instructions may be executed). Implementations of any of the described techniques may include a method or process, apparatus, device, machine, system, or instructions stored on a computer-readable medium.

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Figure 1:
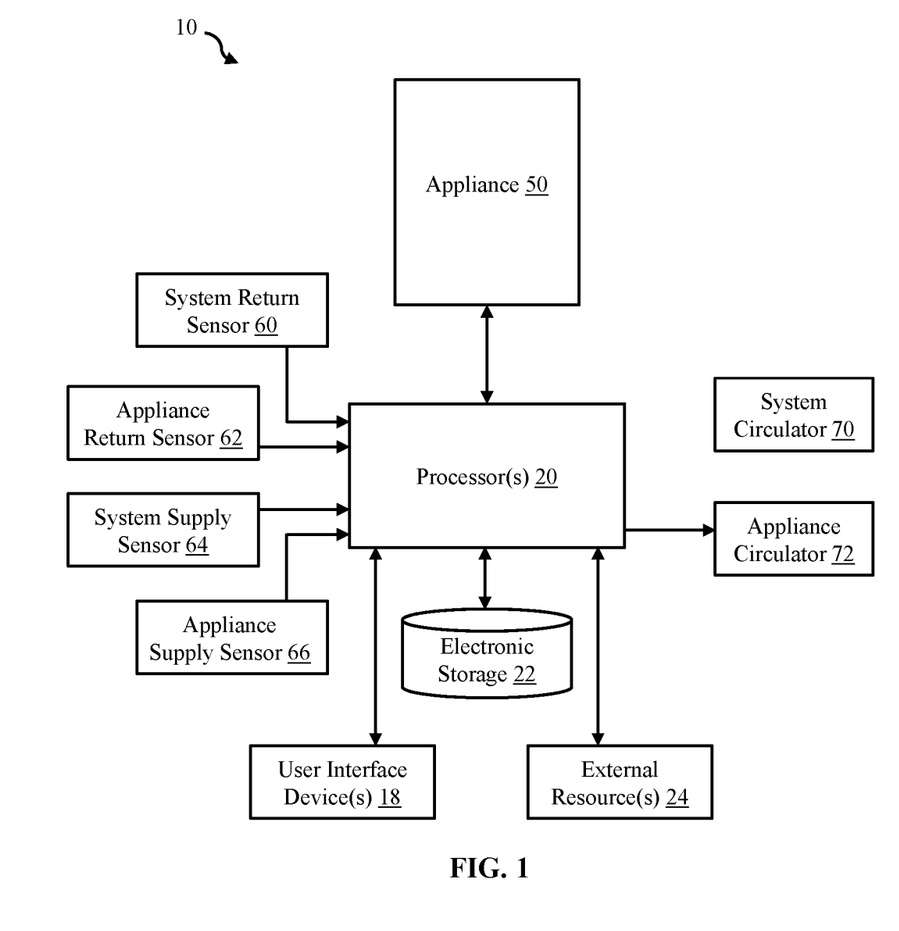
FIG. 1 schematically illustrates a hydronic system configured for controlling an appliance circulator, in accordance with one or more embodiments.
Figure 3:
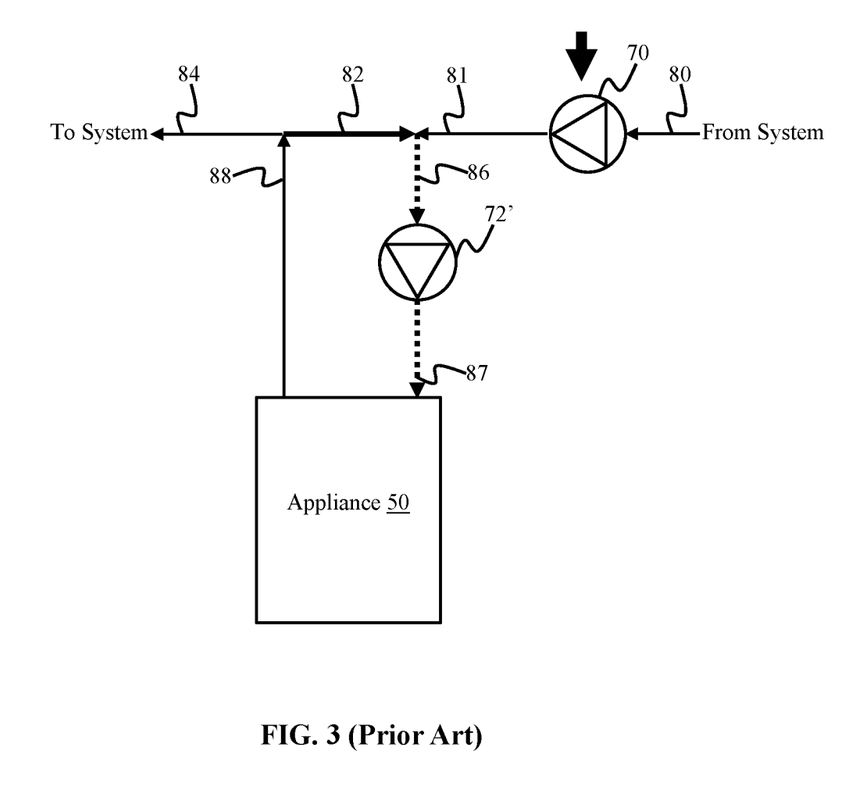
FIG. 3 schematically illustrates a known configuration of a hydronic system exhibiting one type of problem.
Figure 4:
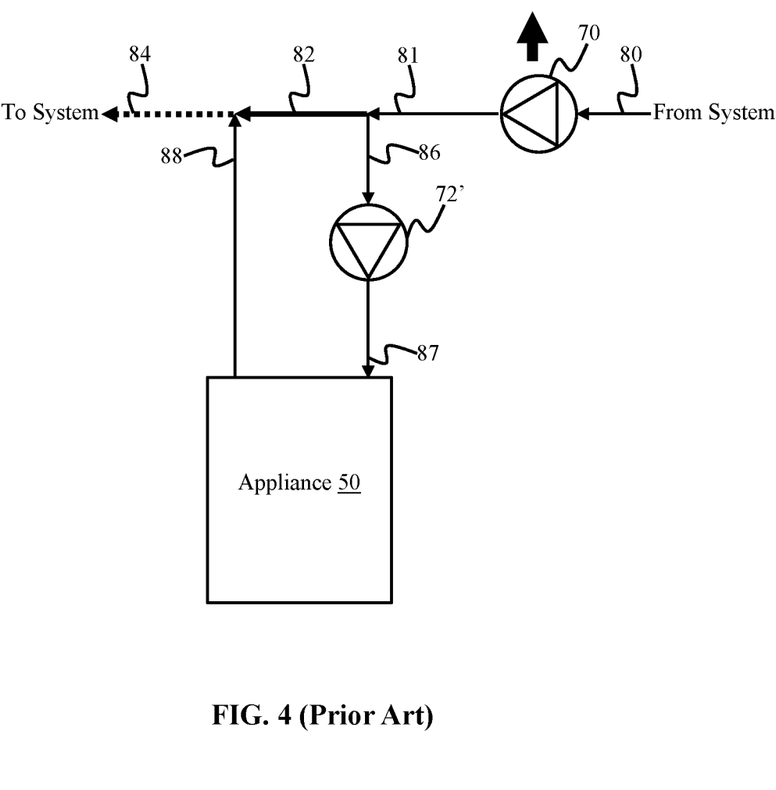
FIG. 4 schematically illustrates a known configuration of a hydronic system exhibiting another type of problem.
Figure 5:
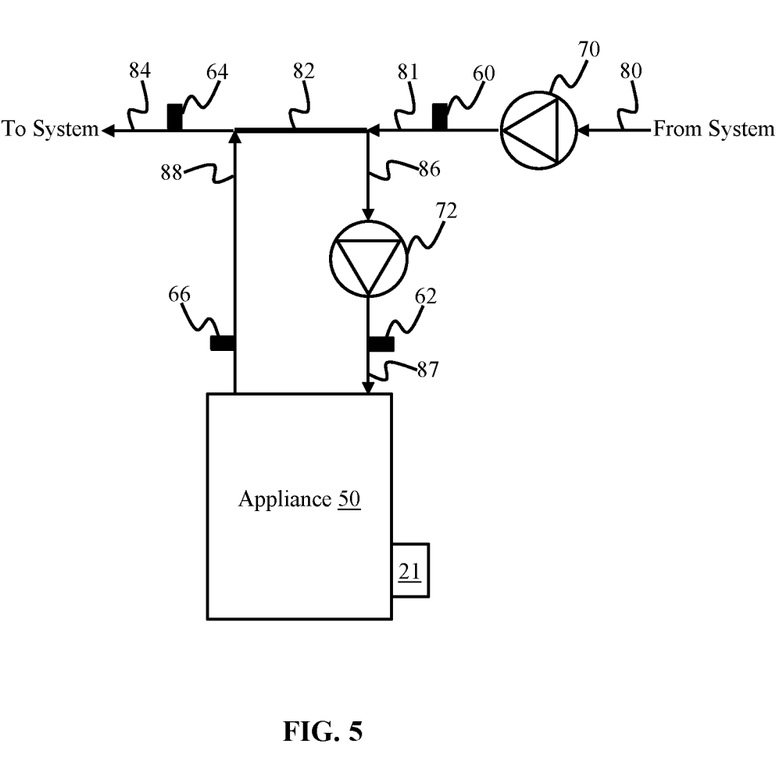
FIG. 5 schematically illustrates a configuration of a hydronic system having variable-speed system and appliance circulators, in accordance with one or more embodiments.

FIG. 1 depicts system 10 for controlling a speed of appliance circulator 72, system 10 including this variable-speed circulator, processor 20, appliance 50, electronic storage 22, user interface device 18, external resource 24, variable-speed system circulator 70, and four different temperature sensors. These sensors may be system return sensor 60, system supply sensor 64, appliance return sensor 62, and appliance supply sensor 66. System return sensor 60 may be positioned at the return flow from the hydronic system (e.g., at or near line 80, which is depicted in FIGS. 3-5), and appliance return sensor 62 may be positioned at the return side of appliance 50. Similarly, system supply sensor 64 may be positioned at the supply flow to the hydronic system (e.g., at or near line 84, which is depicted in FIGS. 3-5), and appliance supply sensor 66 may be positioned at the supply side of appliance 50. System 10 may supply a heated or chilled fluid to an entire system (e.g., a room, floor of a building, the entire building, or another portion of a structure). Processor 20 of system 10 may control appliance circulator 72.

Herein, the "speed" of circulators is described with respect to system and/or appliance circulators to refer to the speed of flow or amount of flow, not the rotational speed of the pump. For example, to state that the appliance pump and system pump are the same speed is not to state that they have the same rotational speed. Rather, by this language, the present disclosure intends to state that they have the same amount of flow.

In some embodiments, appliance 50 is a high efficiency and semi-commercial (or fully commercial) appliance. In some embodiments, appliance 50 is a boiler. In other embodiments, appliance 50 is a chiller or any other device with respect to which a fluid circulates.

In some embodiments, one or more of sensors 60, 62, 64, and 66 may be a thermostat, aquastat, or another form of temperature sensor.

In some embodiments, one or more of circulators 70 and 72 is a pump, circulating pump, or another device that mechanically moves fluids. Circulating pumps are used to move water in a hydronic heating or cooling system, and they are typically electrically powered. The terms circulator and pump may be used interchangeably herein.

In some embodiments, system 10 operates with respect to water circulating through appliance 50. In other embodiments, system 10 operates with respect to any another fluid acted upon by appliance 50.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a computing device (e.g., controller 21 of FIG. 5) together with processor 20, in a computing device (e.g., controller 21 of FIG. 5) that is part of external resources 24, in user interface devices 18, and/or in other locations.

In some embodiments, controller 21 comprises user interface device 18, processor 20, electronic storage 22, external resource 24, and/or other components of system 10.

Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., erasable programmable read-only memory (EPROM), RAM, etc.), solid-state storage media (e.g., flash drive, etc.), and/or other electronically readable storage media. Electronic storage 22 may include circuitry that allows information (e.g., computer-readable instructions and other data) to be stored and retrieved. Electronic storage 22 may store software algorithms, information obtained and/or determined by processor 20, information received via user interface devices 18 and/or other external computing systems, information received from external resources 24, and/or other information that enables system 10 to function as described herein.

Electronic storage 22 may include transitory memory (e.g., RAM) and non-transitory memory (e.g., NVRAM). Access to electronic storage 22 may be controlled by a memory controller.

External resources 24 may include sources of information (e.g., databases, websites, etc.), external entities participating with system 10, one or more computers outside of system 10, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by other resources included in system 10.

External resources 24, processor 20, user interface device 18, electronic storage 22, and/or other components of system 10 may be configured to communicate with each other via wired (e.g., Ethernet cabling, universal serial bus (USB), etc.) and/or wireless (e.g., cellular technology, Wi-Fi technology, Bluetooth® technology, near-field communication (NFC) technology, radio frequency (RF), etc.) connections, via a network (e.g., a network adapter for a local area network (LAN) and/or the Internet), and/or via other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface (UI), processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus (e.g., peripheral component interconnect (PCI) bus), a switch, network, or other communication means. The communication may be wireless or wired. In some embodiments, user interface devices 18 are laptops, desktop computers, smartphones, tablet computers, and/or other user interface devices.

Data and content may be exchanged between the various system 10 components through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6). In some embodiments, data accessible with respect to external resources 24, electronic storage 22, and/or user interface device 18 may come from a building automation system (BAS). System sensors are commonly used in building automation systems. Accordingly, the data for implementing the herein disclosed algorithms may be processed and communicated from a BAS.

In some embodiments, processor 20 may belong to a computing device, a user device, a consumer electronics device, a mobile phone, a smartphone, a personal data assistant, a digital tablet/pad computer, a wearable device, a personal computer, a laptop computer, a notebook computer, a work station, a server, a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

Processor 20 may be configured via machine-readable instructions to execute functionality for receiving readings from temperature sensors (or other types of sensors) and for controlling pumps (e.g., variable-speed circulator(s)). Processor 20 may be configured to execute these components by: software; hardware; firmware; some combination of software, hardware, and/or firmware; and/or other mechanisms for configuring processing capabilities on processor 20.

FIG. 3 illustrates one type of problem that may exist with respect to a known configuration of a hydronic system. More particularly, FIG. 3 depicts an appliance piped in a secondary loop, with respect to a primary (system) loop. The primary loop may comprise lines 80, 81, 82, and 84 and system circulator 70. The secondary loop may comprise lines 88, 82, 86, and 87, appliance circulator 72', and appliance 50.

FIG. 3 further illustrates a typical situation where a single-speed circulator is used. For example, appliance circulator 72' is a single-speed circulator. In some use cases, system circulator 70 operates at a same speed as appliance circulator 72'. More relevant to the situation depicted in FIG. 3, i.e., in other use cases, system circulator 70 operates at least temporarily at a slower speed than appliance circulator 72'.

The use of single-speed circulating pump 72' in the configuration of FIG. 3 poses a problem, since if system circulator 70 is variable-speed, the two circulators can be unmatched and/or out of synchronization. More particularly, the flows through each of these circulators are liable to be different. This is problematic at least because, when demand in the hydronic system from appliance 50 is low, system circulator 70 may be modulated to a lower speed to save energy. When this circulator slows, the appliance supply flow may be too fast. To better illustrate this issue, assume that appliance 50 is a boiler. Therefore, with a slowed system circulator 70, line 82 may have a recirculating flow (e.g., backwards) that causes lines 86-87 to be tempered up due to the hot water from line 88. This tempering at lines 86 and 87 is depicted as dotted arrows in FIG. 3, and the recirculating flow at line 82 is depicted with a thicker line. One of the problems associated with the tempering of lines 86-87 is that the efficiency of boiler 50 is lower, since boiler 50 is less efficient the hotter its return/input is.

FIG. 3 shows lines 86-87 at the appliance return side being tempered up. FIG. 3 thus shows that, when system circulator 70 is driven to a lower speed (e.g., due to lower system demand), the boiler circulator may be running too fast than is necessary, causing the recirculating flow and said tempering. In this system, with appliance circulator 72' running at a fixed speed, there is an electrical inefficiency. That is, in use cases when the appliance is a boiler, the warmer the water going into the boiler the less efficient the boiler will be. By the presently disclosed approach, described in detail below, there is both an electrical and thermal (combustion) savings. For example, as demonstrable with respect to FIG. 5, if the appliance return temperature is greater (e.g., hotter) than the system return temperature, then appliance circulator 72 is slowed until these temperatures are brought closer to each (e.g., within a threshold amount). Therefore, since the coldest temperature in the system is the system return, by slowing boiler circulator 72, in these use cases, the boiler return temperature measured at sensor 62 may come to match the colder return temperature.

In other words, the issues described with respect to FIG. 3 may result in running a single-speed circulator at a higher electrical load than if the circulator were modulated, which causes both combustion and electrical inefficiencies. The backwards (recirculating) flow is caused by the flow in the secondary loop being greater than is required by the current load of the system.

FIG. 4 illustrates another type of problem that may exist with respect to a known configuration of a hydronic system. More particularly, FIG. 4 depicts a similar configuration as FIG. 3, i.e., where the appliance is piped in the secondary loop. FIG. 4 may further illustrate the typical situation where single-speed appliance circulators are used. In use cases depicted in FIG. 4, system circulator 70 operates at a same speed as or at a faster speed than appliance circulator 72'.

Appliance circulator 72' being a single-speed circulator, in the configuration of FIG. 4, may cause a problem when used with variable-speed system circulator 70, e.g., when demand in the system from appliance 50 is high. In this situation, system circulator 70 may be modulated to a higher speed. When this circulator quickens, the appliance supply may be too slow, resulting in excess flow from the return side. This issue of FIG. 4 is depicted with line 82 being thicker and with its arrow pointing leftwards (from the return side) towards the system. This excess flow causes line 84 to be tempered, hence the dotted arrow for line 84. To better illustrate this issue, assume that appliance 50 is a boiler. Therefore, with a quickened system circulator 70, line 82 may be caused to flow into line 84, thus tempering it down. And this is because water from line 80 may be cold. One of the problems associated with the tempering of line 84 is that the performance and thermal efficiency drops because the supply water to the system has been decreased by the system return through the closely spaced tees. This one problem is depicted in FIG. 4 with respect to an accelerating (or quickened) system circulator, but the one problem may also occur when appliance circulator 72' (more particularly appliance circulator 72, as described below) is modulated to a lower speed.

In other words, the temperature of the system supply in the situation depicted in FIG. 4 may be lowered due to the primary flow being tempered with water from the system. This may occur when appliance circulator 72' is running too slow relative to system circulator 70. The problem depicted, here, is that the appliance (e.g., a boiler) would have to be run at a higher input and temperature to compensate for the leftward flow at line 82 to achieve the desired temperature target at system sensor 64. One potential problem, when this particular instance occurs, is that the boiler, having an increase in input and temperature to achieve the desired system sensor, will end up exceeding a safety limit causing a lockout reset condition. Increasing the speed of the circulator in this instance could potentially alleviate that condition.

System 10 comprises an appliance piped primary/secondary (e.g., by utilizing a hydraulic separation device, such as closely-spaced tees) utilizing system return and appliance return temperature sensors 60 and 62, respectively. System 10 automatically adjusts the flow thorough the appliance, minimizing the recirculation through the appliance secondary loop by adjusting the appliance circulator speed to minimize the temperature difference between system return temperature sensor 60 and appliance return temperature sensor 62. This provides thermal efficiency gains because the return water provided to the appliance has not been increased by the appliance outlet water through the closely-spaced tees. Electrical consumption is also reduced as a result because the appliance circulator would be operating at a lower speed. For example, if the return water to a boiler has been tempered, in this manner, it increases the return temperature to the appliance, which reduces the effectiveness of the heat exchanger causing a lower efficiency.

System 10 may further utilize system supply and appliance supply temperature sensors 64 and 66, respectively. Using the same methodology as above, except by applying it to the supply sensors, would effectively minimize the recirculating flow through the primary loop. This would be accomplished, e.g., by adjusting the boiler circulator speed to minimize the temperature difference between boiler supply temperature sensor 66 and system supply temperature sensor 64. This provides performance and thermal efficiency gains because the supply water to the system has not been decreased by the system return water through the closely-spaced tees. If the supply water to the system has been otherwise tempered, it forces the boiler to operate at a higher temperature (lower efficiency), while not providing the correct system supply temperature (lower performance).

Each of these algorithmic approaches may be utilized by controller 21 for increased efficiency. However, the above algorithms may be combined to optimize the flow in all situations (e.g., in the boiler secondary loop) by matching the variable flow in the system primary loop. This combined approach maximizes thermal and electrical efficiency across a broad operating range. That is, the flow is optimized (between the closely-spaced tees) by slowing down circulator 72 via a first portion of the disclosed algorithm (e.g., operations 102, 104, and 106 of FIG. 2) and then by speeding it up when necessary via a second portion of the disclosed algorithm (e.g., operations 108, 110, and 112 of FIG. 2). The ordering of these operations may be opposite than what is shown in FIG. 2, e.g., where the speed of appliance circulator 72 is first increased and then decreased.

A result of the disclosed approach may be to decrease operating cost and simplify the overall control system integration for an end-user. This approach also resolves the technical problem of controlling both the gas input of a boiler and a variable speed circulator, e.g., by utilizing one control printed circuit board (PCB). This inherently comes with some technological difficulty, since varying the speed of the circulator can have a direct effect on the gas input. Therefore, the gas input and circulator speed control loops would be engaging against each other. This could lead to increased cycling, which is harmful to equipment and efficiencies.

Figure 2:
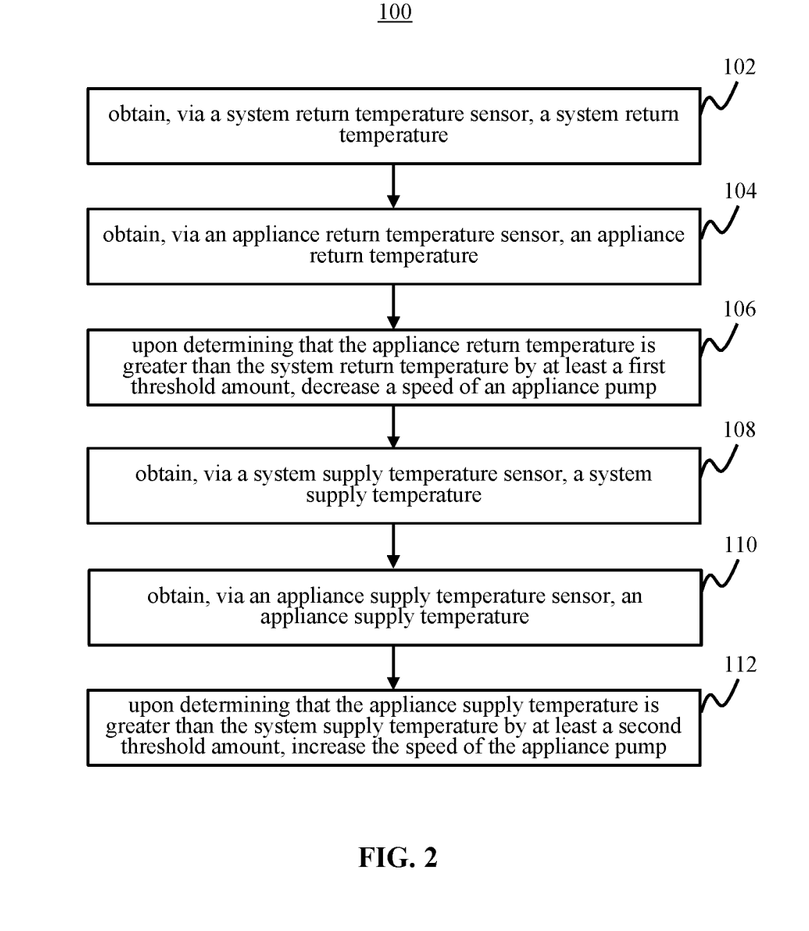
FIG. 2 illustrates a method for controlling an appliance circulator, in accordance with one or more embodiments.

FIG. 2 illustrates method 100 for optimally controlling the variable speed of appliance circulating pump 72 depicted in FIGS. 1 and 5. Method 100 may be performed with controller 21 comprising one or more computer processors and/or other components. The processor is configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 2 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, a system return temperature is obtained via system return temperature sensor 60. As an example, the temperature of a fluid passing through lines 80 and/or 81 or within circulating pump 70 may be periodically, irregularly, or continuously sampled. This sampled temperature may be periodically, irregularly, or continuously supplied to processor 20 or to another component of controller 21. In some embodiments, operation 102 is performed by processor 20 of controller 21 (shown in FIGS. 1 and 5 and described herein).

At operation 104 of method 100, an appliance return temperature is obtained via appliance return temperature sensor 62. As an example, the temperature of a fluid passing through lines 86 and/or 87 or within circulating pump 72 may be periodically, irregularly, or continuously sampled. This sampled temperature may be periodically, irregularly, or continuously supplied to processor 20 or to another component of controller 21. In some embodiments, operation 104 is performed by processor 20 of controller 21 (shown in FIGS. 1 and 5 and described herein).

At operation 106 of method 100, upon determining that the appliance return temperature is greater than the system return temperature by at least a first threshold amount, a speed of appliance pump 72 is decreased. As an example, circulating pump 72 may be slowed such that the temperature difference between sensors 60 and 62 is brought to within the first threshold range, e.g., such that a recirculating flow otherwise flowing backwards in line 82 is minimized. In some embodiments, this pump may be iteratively or continually modulated slower, i.e., as long as this temperature difference remains above the first threshold. A speed of pump 72 may stop being modulated lower, though, due to a risk that a speed of the flow into appliance 50 sinks to below an acceptable threshold level. For example, operation 106 may be limited by safe operating limits of the flow into appliance 50. In some embodiments, operation 106 is performed by processor 20 of controller 21 (shown in FIGS. 1 and 5 and described herein).

At operation 108 of method 100, a system supply temperature is obtained via system supply temperature sensor 64. As an example, the temperature of a fluid passing through line 84 may be periodically, irregularly, or continuously sampled. This sampled temperature may be periodically, irregularly, or continuously supplied to processor 20 or to another component of controller 21. In some embodiments, operation 108 is performed by processor 20 of controller 21 (shown in FIGS. 1 and 5 and described herein).

At operation 110 of method 100, an appliance supply temperature is obtained via appliance supply temperature sensor 66. As an example, the temperature of a fluid passing through line 88 may be periodically, irregularly, or continuously sampled. This sampled temperature may be periodically, irregularly, or continuously supplied to processor 20 or to another component of controller 21. In some embodiments, operation 110 is performed by processor 20 of controller 21 (shown in FIGS. 1 and 5 and described herein).

At operation 112 of method 100, upon determining that the appliance supply temperature is greater than the system supply temperature by at least a second threshold amount, the speed of appliance pump 72 is increased. As an example, circulating pump 72 may be modulated to a greater speed such that the temperature difference between sensors 66 and 64 is brought to within the second threshold range, e.g., such that a recirculating flow otherwise flowing forwards in line 82 is minimized. This minimum flow is depicted in FIG. 5 with the thicker line 82 having no arrowhead. In some embodiments, pump 72 may be iteratively or continually modulated faster, i.e., as long as this temperature difference remains above the second threshold. A speed of pump 72 may stop being modulated higher, though, when a risk that a speed of the flow into appliance 50 grows to above an acceptable threshold level. For example, operation 112 may be limited by safe operating limits of the flow into appliance 50. In some embodiments, operation 112 is performed by processor 20 of controller 21 (shown in FIGS. 1 and 5 and described herein).

Operations 102-112 may be performed as written when appliance 50 is a boiler. Some aspects of operations 102-112, where appropriate, may be performed in an opposite manner, when appliance 50 is a chiller.

FIG. 5 depicts a configuration where an appliance is piped in a secondary loop, with respect to the primary loop. The primary loop may comprise lines 80, 81, 82, and 84, system circulator 70, and temperature sensors 60 and 64. The secondary loop may comprise lines 88, 82, 86, and 87, appliance circulator 72, appliance 50, and temperature sensors 66 and 62. Temperature sensor 60 may be a system return sensor, temperature sensor 64 may be a system supply sensor, temperature sensor 62 may be an appliance return sensor, and temperature sensor 66 may be an appliance supply sensor.

FIG. 5 further illustrates a situation where variable-speed circulators are used. For example, system circulator 70 and appliance circulator 72 are variable-speed circulators. This configuration resolves at least some of the foregoing problems, e.g., to match flows at these circulators. For example, when system demand is low, system circulator 70 may be modulated to a lower speed to reduce energy consumption. When this circulator slows, some embodiments may keep the appliance circulator from operating too fast. To better illustrate this resolution of the issue described with respect to FIG. 3, assume again that appliance 50 is a boiler. Therefore, with a slowed system circulator 70, line 82 may temporarily have a recirculating flow that causes lines 86 and 87 to be tempered up. And, as mentioned, this is because water from line 88 may be relatively hot. Using temperature sensors 60 and 62, when controller 21 detects that temperature measured by boiler return sensor 62 is greater than temperature measured by system return sensor 60 by at least a predetermined threshold amount, controller 21 may control boiler circulator 72 to slow down. As a result of this slowing down, the recirculating flow may cease. Accordingly, FIG. 5 does not show that the flow at line 82 recirculates backwards.

Continuing with this example with respect to FIG. 5, a problem may occur by slowing boiler circulator 72 in the foregoing manner. That is, this circulator may be indefinitely slowed, causing the risk that the boiler becomes fluid-starved. To remedy this issue, the present disclosure contemplates using another pair of sensors at the supply side. That is, the slowing down of boiler circulator 72 may create a similar situation as the one described above with respect to FIG. 4. In this case, system supply sensor 84 may measure (because of the excess flow from the return through line 82) a drop in temperature. Controller 21 may thus detect that temperature measured by boiler supply sensor 66 is greater than temperature measured by system supply sensor 64 by at least a predetermined threshold amount. As a result of this detection, controller 21 may increase the (previously decreased) speed of boiler circulator 72. The controller 21 may thus modulate the speed of boiler circulator 72 to an optimal condition, i.e., effectively balancing the speed of boiler circulator 72. As such, one aspect of the disclosed algorithm resolves the issue where there is too much flow, and another aspect resolves the issue where there is too little flow.

The disclosed approach contemplates protecting against a minimum flow-rate, when modulating appliance 50 using variable speed appliance circulator 72. Maximizing the temperature differential (e.g., by reducing the circulator speed) of the fluid flow in appliance 50 may result in a return temperature that increases efficiency. This may be accomplished, for example, by reducing the speed of boiler circulator 72 through the use of a variable-speed circulator. In this example, a relationship between boiler 50's energy input and a minimum heating fluid flow-rate needed to protect boiler 50 from damage exists based on an acceptable maximum heating fluid temperature rise in the boiler at said energy input, i.e., the temperature rise between appliance sensors 62 and 66. If the heating fluid flow rate is managed, to achieve a heating fluid flow temperature rise less than the maximum heating fluid temperature rise for a respective energy input, damage due to low heating fluid flow velocities may be avoided. The integral (e.g., on-board) boiler control utilizing a proportional-integral-derivative (PID) algorithm may calculate a necessary heating energy input, while simultaneously calculating a maximum temperature rise for the boiler at the respective energy input. The maximum temperature rise is utilized as a limit for variable speed circulator control. In other words, there is a maximum temperature rise or a minimum flow rate required at boiler 50.

One purpose of controller 21 is to slow the boiler pump 72 to match the system demand as close as possible, maximizing the efficiency. However there are limits to this. If the flow (circulator speed) is reduced too much this can be dangerous for the boiler. One way to recognize the flow has been reduced too much has been explained in the previous paragraph. Another way is with a variable-speed boiler circulator. For example, if system return and boiler return temperatures are within a set range and if the system supply temperature is out of range (e.g., less than the boiler outlet by a certain amount), then the flow through the boiler has been reduced too much and the speed of the circulator should increase.

PID controllers may read sensors, then compute a desired output by calculating proportional, integral, and derivative responses and by summing those three components to compute the output. PID control may be used to modulate a unit up or down based on a (i) difference from a set point, (ii) actual temperature, and/or (iii) how long it has been different, hence a control loop. Bringing this all into one controller may sequence which things need to happen and in what order and make those decisions in that order. Therefore, for example, if a boiler return temperature matches the system return temperature, but yet a boiler supply sensor and system supply sensor measure temperatures below a target, then the controller (e.g., controller 21) may begin increasing the energy going into the system. Then, when the return temperatures change again, the controller may adjust the boiler circulator (flow rate) again, accordingly. Thus, the controller may continue to correct this all in a given set order and not have the boiler shut down in an unsafe condition or lock out because it did not have the adequate flow rate. The input rate of the boiler is thus being benefited by being in one controller (e.g., via the checks and balances of the temperature and/or flow matching, as contemplated herein). As such, controller 21 may be based on a same PID algorithm that is used to control the energy input.

In some embodiments, controller 21 is a control loop feedback mechanism that provides continuously modulated control. Such PID control may continuously calculate an error value as the difference between a desired set point and a measured process variable and apply a correction to a control function to minimize the error by adjusting the process control inputs based on proportional (P), integral (I), and derivative (D) terms. Controller 21 may thus apply accurate, optimized, and automatic control. In some embodiments, controller 21 implements a PI controller rather than PID. In other words, some implementations of a PI algorithm is with respect to the system set point versus actual temperature, looking at the error and the integral values, and driving the input higher or lower based on them.

The disclosed approach is to be integrated into an existing on-board appliance controller, which removes the need for a third-party control system. Third-party control systems are technologically suboptimal and more complex (e.g., by nature of being third-party). Further, the independent, third-party system may fight the existing on-board appliance controller and cause even bigger issues. System operators, for example, may have to make adjustments that do not result in any efficiency gains because they have had to adjust it so far out of an efficient mode just to ensure that the two systems (e.g., one system being an on-board controller and the other being the hypothetical third-party system) do not fight each other, as they are hunting for a correct operating point. Quite simply, controller 21 may control circulator 72 to match the system speed/flow, while still getting the appropriate amount of energy into the system and without having two different control systems fight each other.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for controlling an appliance pump, the method comprising:
    obtaining, via a system return temperature sensor, a system return temperature;
    obtaining, via an appliance return temperature sensor, an appliance return temperature; and
    responsive to a determination that the appliance return temperature is greater than the system return temperature by at least a first threshold amount, decreasing, via a hardware processor, a speed of the appliance pump until a flow in a secondary loop matches a flow in a primary, system loop.

2. The method of claim 1, wherein an appliance and the appliance pump are piped as the secondary loop utilizing a hydraulic separation device.

3. The method of claim 2, wherein the appliance is a boiler.

4. The method of claim 2, wherein the appliance is a chiller.

5. The method of claim 2, further comprising:
    responsive to a determination that a temperature change of a fluid in the appliance at an energy input of the appliance breaches a threshold, increasing, via the hardware processor, the speed of the appliance pump.

6. The method of claim 2, wherein the hydraulic separation device is a pair of closely-spaced tees.

7. The method of claim 1, further comprising:
    obtaining, via a system supply temperature sensor, a system supply temperature;
    obtaining, via an appliance supply temperature sensor, an appliance supply temperature; and
    responsive to a determination that the appliance supply temperature is greater than the system supply temperature by at least a second threshold amount, increasing, via the hardware processor, the speed of the appliance pump.

8. The method of claim 7, wherein the speed is increased relative to a speed of a system pump.

9. The method of claim 1, wherein the appliance pump is a variable-speed appliance circulator.

10. The method of claim 1, wherein the speed is decreased relative to a speed of a system pump.

11. The method of claim 10, wherein the system pump is a variable-speed system circulator.

12. The method of claim 1, wherein the method is implemented on-board an appliance in a controller without using a third-party device.

13. A method for controlling an appliance pump, the method comprising:
    obtaining, via a system supply temperature sensor, a system supply temperature;
    obtaining, via an appliance supply temperature sensor, an appliance supply temperature; and
    responsive to a determination that the appliance supply temperature is greater than the system supply temperature by at least a threshold amount, increasing, via a hardware processor, a speed of the appliance pump until a flow in a secondary loop matches a flow in a primary, system loop.

14. The method of claim 13, wherein an appliance and the appliance pump are piped as the secondary loop utilizing a hydraulic separation device.

15. A system for controlling an appliance pump, comprising:
    an appliance;
    a system return temperature sensor;
    an appliance return temperature sensor; and
    a processor coupled to a storage device storing instructions that, when executed, cause configure the processor to perform the following operations:
        obtain, via the system return temperature sensor, a system return temperature;
        obtain, via the appliance return temperature sensor, an appliance return temperature; and
        responsive to a determination that the appliance return temperature is greater than the system return temperature by at least a first threshold amount, decrease a speed of the appliance pump until a flow in a secondary loop matches a flow in a primary, system loop.

16. The system of claim 15, wherein the appliance and the appliance pump are piped as the secondary loop utilizing a hydraulic separation device.

17. The system of claim 15, further comprising:
    a system supply temperature sensor; and
    an appliance supply temperature sensor,
    wherein the processor is further caused to:
        obtain, via the system supply temperature sensor, a system supply temperature;
        obtain, via the appliance supply temperature sensor, an appliance supply temperature; and
        responsive to a determination that the appliance supply temperature is greater than the system supply temperature by at least a second threshold amount, increase the speed of the appliance pump.

* * * * *